United States Patent
Boeglin

(10) Patent No.: US 10,836,017 B2
(45) Date of Patent: Nov. 17, 2020

(54) CLAMP ASSEMBLIES AND METHODS OF USE

(71) Applicant: Toyota Motor Engineering & Manufacturing North America, Inc., Erlanger, KY (US)

(72) Inventor: Alvin J. Boeglin, Ferdinand, IN (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 380 days.

(21) Appl. No.: 15/825,381

(22) Filed: Nov. 29, 2017

(65) Prior Publication Data
US 2019/0160633 A1    May 30, 2019

(51) Int. Cl.
| | | |
|---|---|---|
| *B25B 5/00* | (2006.01) | |
| *B25B 5/16* | (2006.01) | |
| *B25B 5/04* | (2006.01) | |
| *B25B 5/02* | (2006.01) | |
| *B25B 5/12* | (2006.01) | |
| *B25B 27/00* | (2006.01) | |
| *B25B 27/28* | (2006.01) | |
| *B23P 19/04* | (2006.01) | |

(52) U.S. Cl.
CPC ............... *B25B 5/163* (2013.01); *B25B 5/02* (2013.01); *B25B 5/04* (2013.01); *B25B 5/12* (2013.01); *B25B 5/125* (2013.01); *B25B 5/127* (2013.01); *B25B 27/0035* (2013.01); *B23P 19/04* (2013.01); *B25B 27/28* (2013.01)

(58) Field of Classification Search
CPC .... B25B 1/00; B25B 1/02; B25B 1/04; B25B 3/00; B25B 5/00; B25B 5/101
See application file for complete search history.

(56) References Cited

U.S. PATENT DOCUMENTS

| | | | | |
|---|---|---|---|---|
| 3,971,552 A | * | 7/1976 | Mayfield ................... | B25B 5/06 269/228 |
| 4,483,059 A | * | 11/1984 | Dearman ........... | B23K 37/0533 228/49.3 |
| 6,158,729 A | * | 12/2000 | Tsai ........................ | B25B 5/12 269/136 |
| 6,530,566 B1 | * | 3/2003 | DuVernay ................ | B25B 5/12 269/201 |

(Continued)

FOREIGN PATENT DOCUMENTS

| | | |
|---|---|---|
| CN | 202045489 | 11/2011 |
| CN | 202668381 | 1/2013 |

(Continued)

*Primary Examiner* — Lee D Wilson
(74) *Attorney, Agent, or Firm* — Dinsmore & Shohl LLP

(57) ABSTRACT

A clamping assembly sized to clamp adjacent body panels of a vehicle together for an assembly operation includes a handle assembly including a handle that rotates in a first plane about a pivot location. A jaw assembly includes a first jaw structure that moves relative to a second jaw structure in a second plane parallel to the first plane. A linkage assembly operably connects the handle assembly and the jaw assembly using an actuation pin such that rotating the handle assembly in the first plane moves first jaw structure toward and away from the second jaw structure in the second plane between open and closed configurations by extending and retracting the actuation pin relative to the second jaw structure.

20 Claims, 7 Drawing Sheets

(56) References Cited

U.S. PATENT DOCUMENTS

| | | | |
|---|---|---|---|
| 8,025,275 B2 | 9/2011 | Wong | |
| 2008/0073823 A1* | 3/2008 | Lin | B25B 1/14 |
| | | | 269/228 |
| 2010/0192734 A1* | 8/2010 | Engvall | B25B 7/10 |
| | | | 81/319 |
| 2019/0160633 A1* | 5/2019 | Boeglin | B25B 5/163 |

FOREIGN PATENT DOCUMENTS

| | | |
|---|---|---|
| DE | 102012015146 | 3/2013 |
| DE | 102013002538 | 3/2014 |
| JP | 5229468 | 7/2013 |
| WO | 2005105379 | 11/2005 |

\* cited by examiner

CLAMP ASSEMBLIES AND METHODS OF USE

TECHNICAL FIELD

The present specification generally relates to clamp assemblies and, in particular, clamp assemblies that can be operated single-handed that are suitable for clamping against vehicle body panels.

BACKGROUND

Automotive vehicle bodies may include a variety of structures that provide strength and rigidity to the vehicle. The underlying structure is generally comprised of a series of sheet metal structures which are joined to create the vehicle body. Vehicle body panels may be assembled onto the underlying structure, providing both aesthetic and structural functions.

Pillar assemblies are vehicle structures that may be welded at a bottom to a vehicle rocker assembly and extend upwardly in a vehicle vertical direction toward a roof assembly. Vehicles frequently include multiple pillars spaced around the vehicles to provide supports for the roof assembly as well as vehicle windows and door structures.

When vehicle body panels are assembled to the vehicles around the pillar assemblies, various alignment features may be provided to assemble the various vehicle body panels together in a reliable fashion. Accordingly, there is a need for clamp assemblies that can be used to releasably clamp adjacent vehicle body panels together for an assembly operation.

SUMMARY

In one embodiment, a clamping assembly sized to clamp adjacent body panels of a vehicle together for an assembly operation includes a handle assembly including a handle that rotates in a first plane about a pivot location. A jaw assembly includes a first jaw structure that moves relative to a second jaw structure in a second plane parallel to the first plane. A linkage assembly operably connects the handle assembly and the jaw assembly using an actuation pin such that rotating the handle assembly in the first plane moves first jaw structure toward and away from the second jaw structure in the second plane between open and closed configurations by extending and retracting the actuation pin relative to the second jaw structure.

In another embodiment, a method of holding a first body panel and a second body panel of a vehicle using a clamping assembly is provided. The method includes placing the clamping assembly in an open configuration. The clamping assembly includes a handle assembly including a handle that rotates in a first plane about a pivot location. A jaw assembly includes a first jaw structure that moves relative to a second jaw structure in a second plane parallel to the first plane. A linkage assembly operably connects the handle assembly and the jaw assembly using an actuation pin such that rotating the handle assembly in the first plane moves first jaw structure toward and away from the second jaw structure in the second plane between open and closed configurations by extending and retracting the actuation pin relative to the second jaw structure. The second jaw structure is placed on the first body panel and the second body panel. The handle assembly is rotated to move the jaw assembly from the open configuration to the closed configuration.

In another embodiment, a clamping assembly sized to clamp adjacent body panels of a vehicle together for an assembly operation includes a handle assembly comprising a handle that rotates about a pivot location. A jaw assembly includes a first jaw structure that moves relative to a second jaw structure. A linkage assembly operably connects the handle assembly and the jaw assembly using an actuation pin. The linkage assembly includes an actuation member that is pivotally connected to the actuation pin. The actuation member is slidably connected to the handle assembly within a gap between spaced-apart bushings.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to clamp assemblies that can be used during vehicle assembly. In particular, the clamp assemblies may be used to releasably hold adjacent vehicle body panels together during the vehicle assembly operation. The clamp assemblies include a jaw assembly and a handle assembly that is rotatably connected to the jaw assembly. Rotation of the handle assembly moves the jaw assembly between an open configuration and a closed configuration. The clamp assemblies may be operated with a single hand that can be used to rotate the handle assembly relative to the jaw assembly to place the jaw assembly in the open and closed configurations. Gravity may also be used to place the jaw assembly in the open configuration while the operator holds the handle assembly in one hand. With the clamp assembly in the open configuration, the jaw assembly may be located on the vehicle for a clamping operation. With the jaw assembly in desired location, the handle assembly may be rotated with a single hand with the jaw assembly engaged with the vehicle until the clamp assembly is placed in the closed configuration thereby clamping two body panels together.

Figure 1:
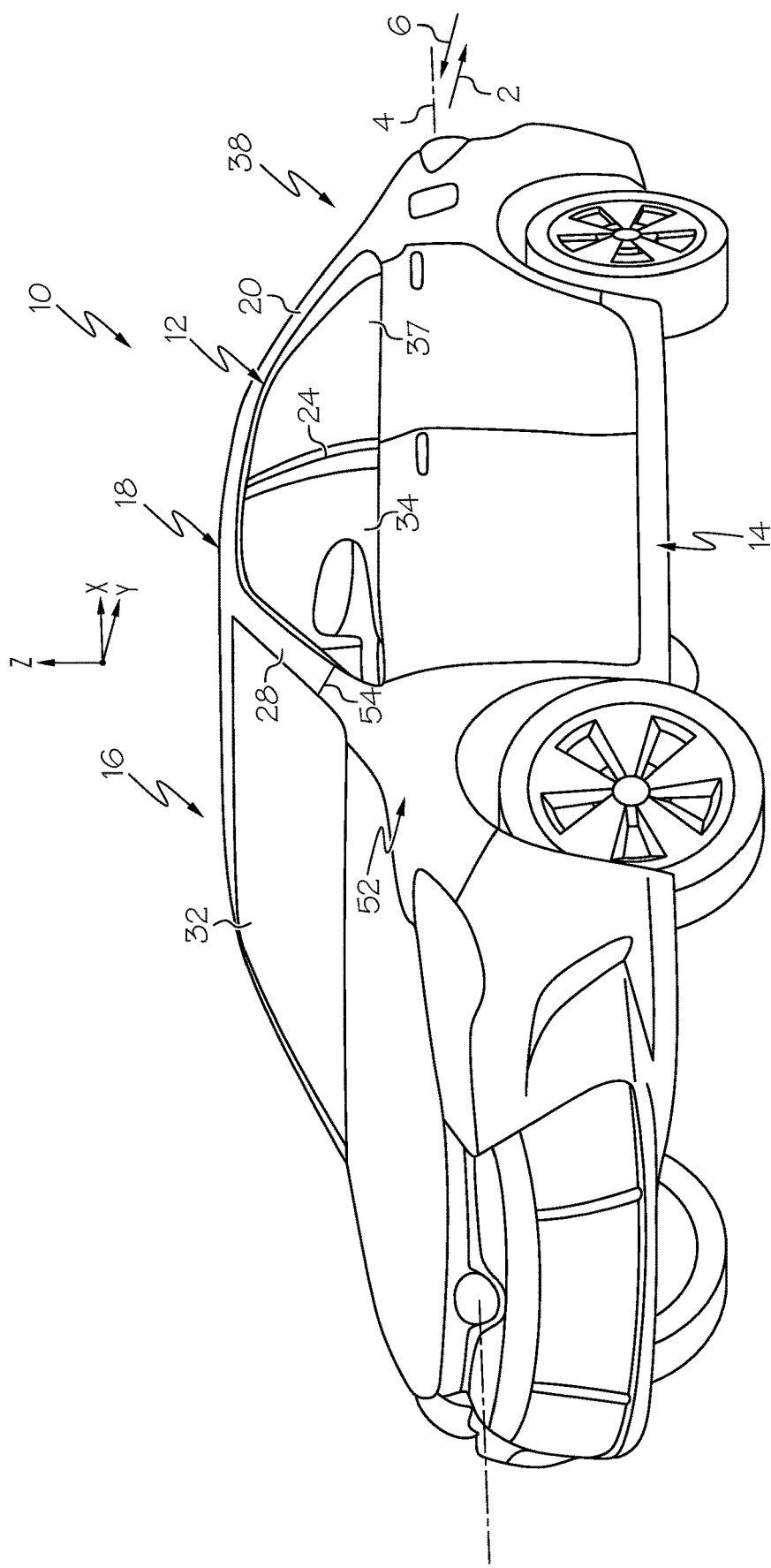
FIG. 1 is a perspective view of a motor vehicle, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Motor vehicles that incorporate elements according to the present disclosure may include a variety of construction methodologies that are conventionally known, including a unibody construction methodology as well as a body-on-frame construction methodology. It should be understood that vehicles that are constructed with body-on-frame or unibody construction may incorporate the elements that are shown and described herein.

Referring to FIG. 1, the vehicle 10 includes a vehicle body 12 including a body framework 14 that includes a pair of side roof rail structures 16 and 18 and various pillar assemblies. The various pillar assemblies are connected to the side roof rail structures 16 and 18 and extend downwardly therefrom in a vehicle vertical direction. These pillar assemblies are generally referred to as a C-pillar assembly 20, B-pillar assembly 24 and a front or A-pillar assembly 28. The front pillar assemblies 28 are located toward the forward end of the vehicle 10, generally between a front windshield 32 and front side windows 34. The B-pillar assemblies 24 are located generally between the front side windows 34 and rear side window 37 of the vehicle 10. Finally, the C-pillar assemblies 20 are located between the rear side window 37 and rear window 38 of the vehicle. Depending on vehicle type, other pillar assemblies, such as D-pillar assemblies may be located rearward of the C-pillar assemblies 20.

Figure 2:
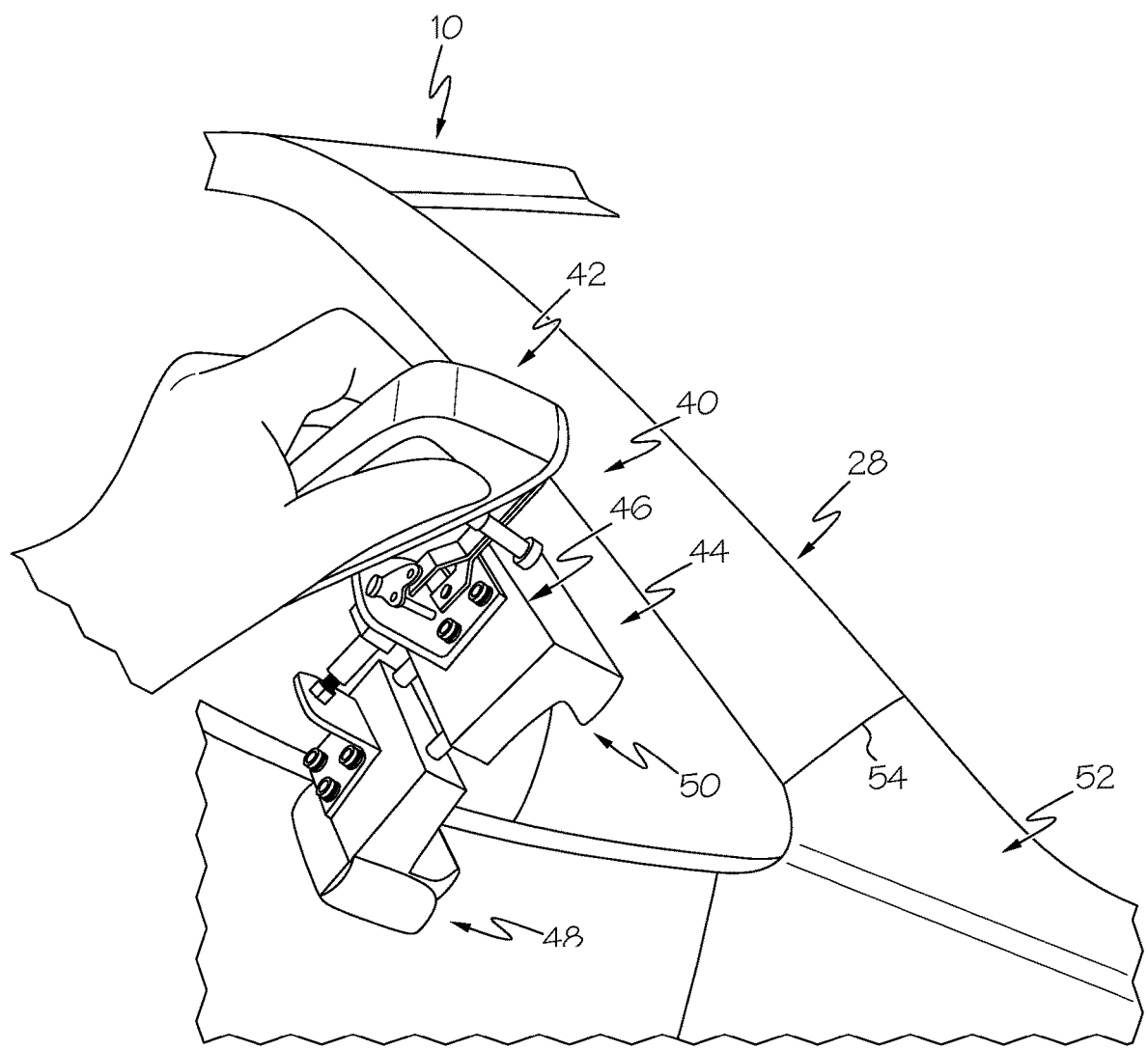
FIG. 2 is a perspective detail view of the vehicle of FIG. 1 showing a clamping assembly, according to one or more embodiments shown and described herein.

Referring to FIG. 2, a one-handed clamp assembly 40 is illustrated next to the vehicle 10. The clamp assembly 40 includes a handle assembly 42 and a jaw assembly 44 that is operably connected to the handle assembly 42 by a moveable linkage assembly 46. The moveable linkage assembly 46 is operated by a connection with the handle assembly 42 to move the jaw assembly 44 between the open and closed configurations.

In FIG. 2, the clamp assembly 40 is illustrated in the open configuration with a first jaw structure 48 separated from a second jaw structure 50. The second jaw structure 50 is immovably fixed to the handle assembly 42, while the first jaw structure 48 is moveable toward and away from the second jaw structure 50 between the open configuration and the closed configuration. The jaw assembly 44 is sized to receive the front pillar assembly 28. In particular, the jaw assembly 44 is sized to receive both the front pillar assembly 28 and front fender 52 with the jaw assembly 44 in the open configuration. As will be described in greater detail below, the jaw assembly 44 spans a seam 54 between the front pillar assembly 28 and the front fender 52 and holds the front fender 52 in position relative to the front pillar assembly 28 with the jaw assembly 44 in the closed configuration for a fender installation operation.

Figure 3:
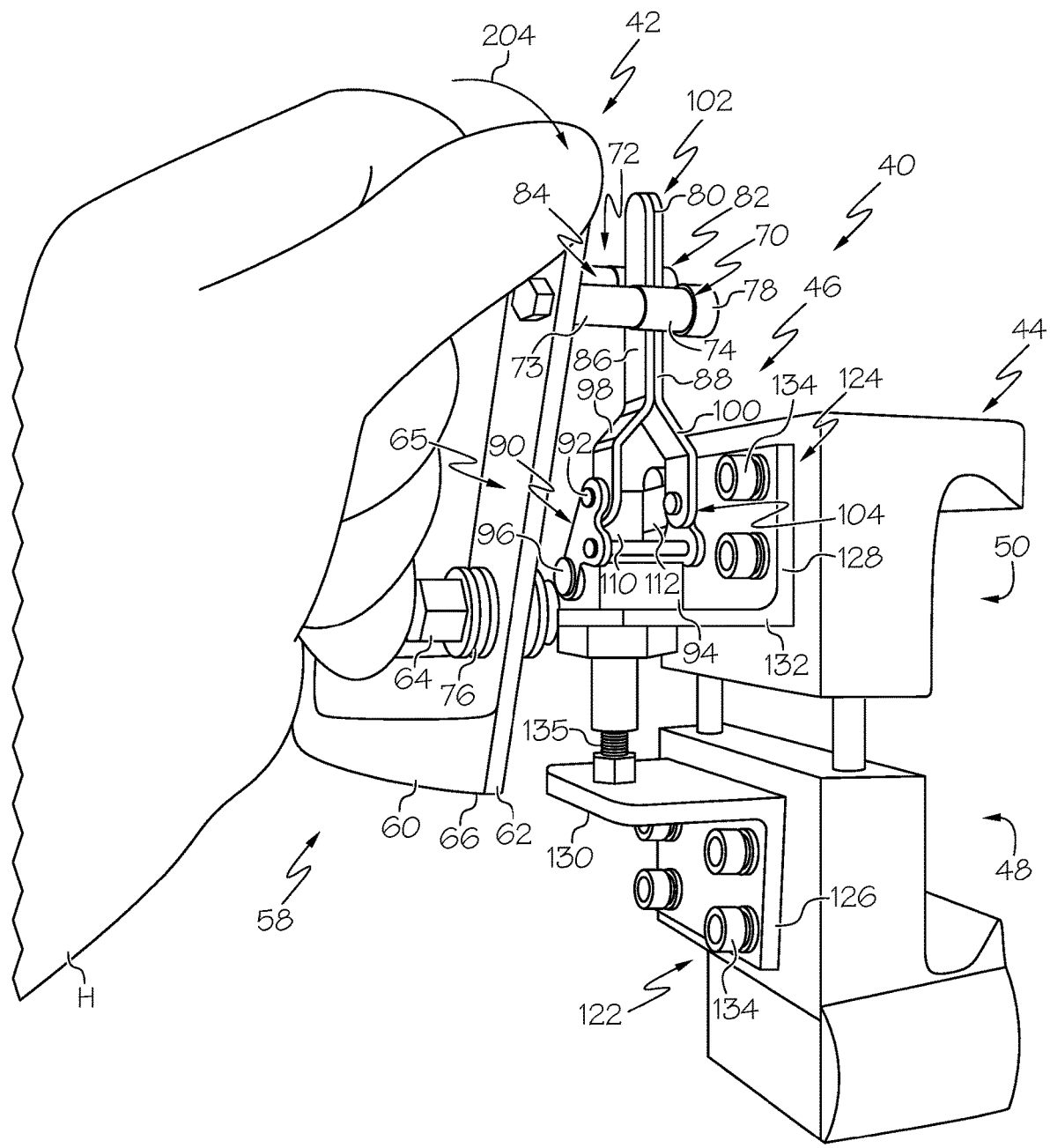
FIG. 3 is a side view of the clamping assembly of FIG. 2 in isolation with the clamping assembly in an open configuration, according to one or more embodiments shown and described herein.

Referring to FIG. 3, a more detailed view of the clamp assembly 40 is illustrated and includes the handle assembly 42, the jaw assembly 44 and the linkage assembly 46 that provides for movement of the jaw assembly 44 between the open and closed configurations with rotation of the handle assembly 42 relative to the jaw assembly 44. The handle assembly 42 includes a handle 58 having a graspable portion 60 and a base portion 62 opposite the graspable portion 60 defining an opening 65 that is sized to receive a hand H of the operator.

The base portion 62 includes a pivot location 64 where the handle 58 is pivotally connected to the linkage assembly 46. The pivot location 64 is located offset from a center of the base portion 62 toward handle end 66. Bearings 76 may be provided to facilitate rotation of the handle 58 about the pivot location 64. At an opposite handle end is a pair of bushings 70 and 72. The bushings 70 and 72 include a rod 73 that extends outwardly from the base portion 62 and a sleeve 74 that is located around the rod 73. The sleeves 74 can provide for increased resistance against sliding wear during use of the clamp assembly 40. In some embodiments, the sleeves 74 may rotate about the rods 73 during rotation of the handle 58. Caps 78 may be used to fasten the bushings 70 and 72 together.

The bushings 70 and 72 are spaced-apart to slidingly receive an arm 80 of an arm actuation member 82. The spacing of the bushings 70 and 72 provides a gap 84 that is sized to receive the arm 80 such that sliding surfaces 86 and 88 of the arm 80 can remain in sliding contact with the bushings 70 and 72 throughout the entire rotation of the handle 58 about the pivot location 64. The arm actuation member 82 is pivotally connected to harness structure 90 at a pivot location 92, which is pivotally connected to a sleeve member 94 at pivot location 96. In particular, the arm actuation member 82 includes a first projecting member 98 that is connected to a second projecting member 100. The projecting members 98 and 100 coextend with one another at a distal portion 102 and diverge at a connecting portion 104. The connecting portion 104 connects to the harness structure 90 at the pivot location 92. The projecting members 98 and 100 diverge at the connecting portion 104 to straddle an actuation pin 110 that is slidably received within the sleeve member 94. As can be appreciated, the pivot locations 64, 92 and 96 are parallel such that rotation of the handle 58 also rotates the arm actuation member 82, which, in turn, moves the actuation pin 110, which will be described in greater detail below.

Figure 4:
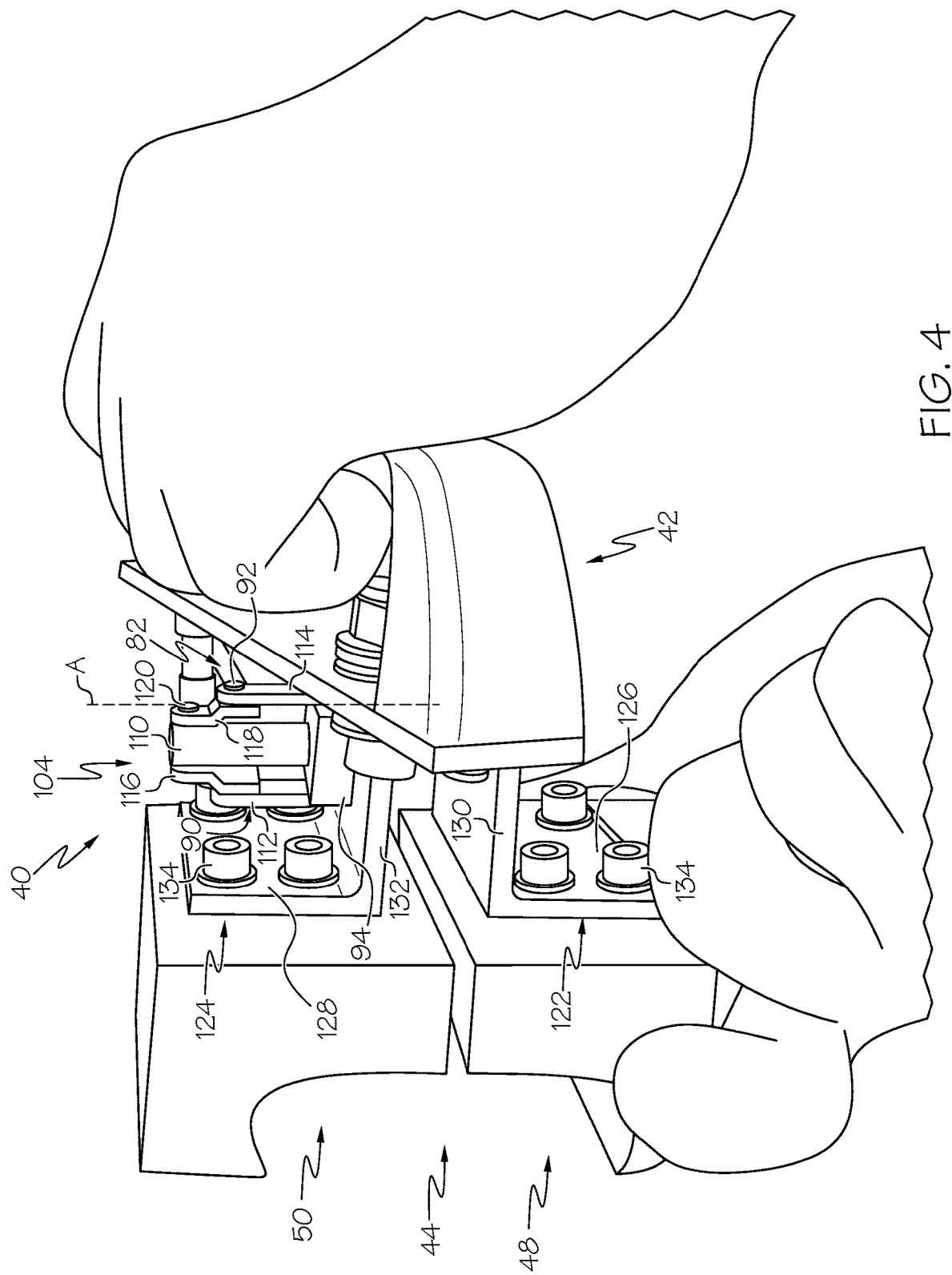
FIG. 4 is another side view of the clamping assembly of FIG. 3 in a closed configuration, according to one or more embodiments shown and described herein.

FIG. 4 illustrates an opposite side of the clamp assembly 40 that more clearly shows a connection between the arm actuation member 82 and the actuation pin 110 with the clamp assembly moving toward the closed configuration. The arm actuation member 82 includes the connecting portion 104 that is connected to the harness structure 90 at the pivot location 94. The harness structure 90 includes legs 112 and 114 that are pivotally connected to the sleeve member 94 at the pivot location 92 (FIG. 3). The connecting portion 104 of the arm actuation member 82 further includes pin connecting fingers 116 and 118 that extend outwardly from the arm actuation member 82 at an angle, for example of about 90 degrees, for an L-shape and connect to the actuation pin 110 at a pivot location 120.

Referring to both FIGS. 3 and 4, the linkage assembly 46 connects the handle assembly 42 to the jaw assembly 44 by brackets 122 and 124. In the illustrated example, the brackets 122 and 124 are L-shaped brackets including a base 126 and 128 and a side wall 130 and 132 that extends outwardly from the respective base 126 and 128. The base 126 may be connected to the first jaw structure 48 using, for example, fasteners 134; however, other suitable connecting structures may be used, such as adhesives, welding, etc. Likewise, the base 128 may be connected to the second jaw structure 50 using fasteners 134.

The actuation pin 110 extends slidably through the sleeve member 94 and also slidably through the side wall 132 of the bracket 124 that is connected to the second jaw structure 50. The actuation pin 110 extends from the sleeve member 94 to the side wall 130 of the bracket 122 where the actuation pin 110 is rigidly connected to the side wall 130, for example, by a threaded fastener connection 135 or by any other suitable connection. As can be appreciated, sliding movement of the actuation pin 110 relative to the bracket 124 can move the bracket 122 toward and away from the bracket 124.

Figure 5:
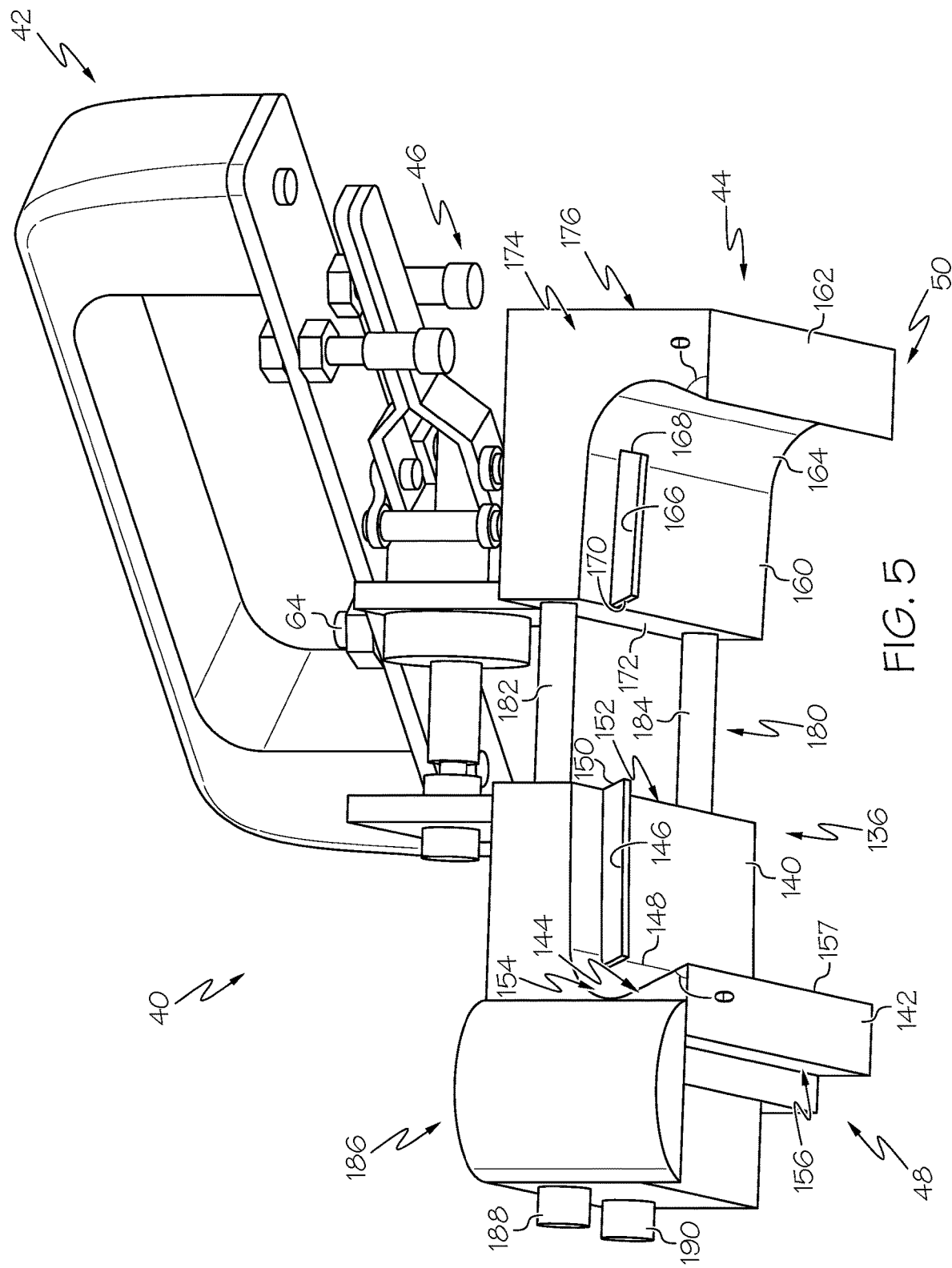
FIG. 5 is a rear view of the clamping assembly of FIG. 3, according to one or more embodiments shown and described herein.

Referring to FIG. 5, a rear perspective view of the clamp assembly 40 is illustrated that shows a rear side 136 of the jaw assembly 44 including the first jaw structure 48 and the second jaw structure 50. As indicated above, the first jaw structure 48 moves relative to the second jaw structure 50 upon rotation of the handle assembly 42 about the pivot location 64 and actuation of the linkage assembly 46. The first jaw structure 48 includes a mounting portion 140 and a clamping portion 142 that extends outwardly from the mounting portion 140 forming an L-shape. The mounting portion 140 may have a contoured face 144 that is shaped to grasp an edge of the vehicle body during an assembly operation. As can be seen, the mounting portion 140 may have a region 154 of reduced thickness and a region 156 of increased thickness providing a wedge structure having an apex angle θ of less than 90 degrees at a projecting edge 157. A shim structure 146 extends outwardly from the face 144 of the first jaw structure 48. In some embodiments, the shim structure 146 may extend continuously between ends 148 and 150, with end 150 intersecting a jaw opposing wall 152 of the first jaw structure 48. In other embodiments, the shim structure may be discontinuous and/or terminate before the jaw opposing wall 152.

The second jaw structure 50 includes a mounting portion 160 and a clamping portion 162 that extends outwardly from the mounting portion 160 forming an L-shape. The mounting portion 160 may have a contoured face 164 that is shaped to grasp an edge of the vehicle body during an assembly operation. As can be seen, the mounting portion 160 may have a region 174 of reduced thickness and a region 176 of increased thickness providing a wedge structure having an apex angle θ of less than 90 degrees at a projecting edge 177. A shim structure 166 extends outwardly from the face 164 of the second jaw structure 50. In some embodiments, the shim structure 166 may extend continuously between ends 168 and 170, with end 170 intersecting a jaw opposing wall 172 of the second jaw structure 50. In other embodiments, the shim structure may be discontinuous and/or terminate before the jaw opposing wall 172. The shim structures 146 and 166 are aligned to be received within the seam 54 of FIG. 2, which is used as a datum to reliably locate the clamp assembly 40 on the vehicle body.

The first jaw structure 48 and second jaw structure 50 may be formed of any suitable material, such as nylon. As examples, the first jaw structure 48 and the second jaw structure may be molded and/or machined into suitable shapes for clamping the vehicle body. In some embodiments, the shim structures 146 and 166 may be monolithically formed as part of the first and second jaw structures 48 and 50. In other embodiment, the shim structures 146 and 166 may be formed separately from the first and second jaw structures 48 and 50 and then attached thereto by any suitable method, such as adhering or welding.

A guide assembly 180 may be provided between the first jaw structure 48 and the second jaw structure 50. In the illustrated example, the guide assembly 180 may include a first guide rod 182 and a second guide rod 184 that is parallel with the first guide rod 182. The first and second guide rods 182 and 184 may be fixedly attached to the second jaw structure 50 and slidably received within the first jaw structure 48 to guide the first jaw structure 48 linearly toward the second jaw structure 50. In some embodiments, the first jaw structure 48 may include a guide member 186 that may be connected to the first jaw structure 48. The guide member 186 may include sleeves 188 and 190 that can provide path lengths for the respective first and second guide rods 182 and 184. In other embodiments, the guide member 186 may not be provided.

Referring again to FIGS. 3 and 4, operation of the clamp assembly 40 between the open configuration (FIG. 3) and the closed configuration (FIG. 4) will be described. Referring first to FIG. 3, with the clamp assembly 40 in the open configuration, the arm 80 of the arm actuation member 82 located between the bushings 70 and 72 is oriented at about 12 o'clock from a perspective of the operator. In this 12 o'clock position of the arm actuation member 82, the harness structure 90 and, more particularly, the legs 112 and 114 of the harness structure 90 are out of alignment with the pin connecting fingers 116 and 118 of the arm actuation member 82, which places the actuation pin 110 in an extended position, opening the first and second jaw structures 48 and 50.

Rotating the handle assembly 42 clockwise in the direction of arrow 204 causes the arm actuation member 82 to also rotate in the clockwise direction. Movement of the arm actuation member 82 brings the legs 112 and 114 of the harness structure 90 and the pin connecting fingers 116 and 118 of the arm actuation member more into vertical alignment (see line A) and raises/retracts an end 206 of the actuation pin 110 away from the side wall 132 of the bracket 124 thereby closing the first and second jaw structures 48 and 50.

Figure 6:
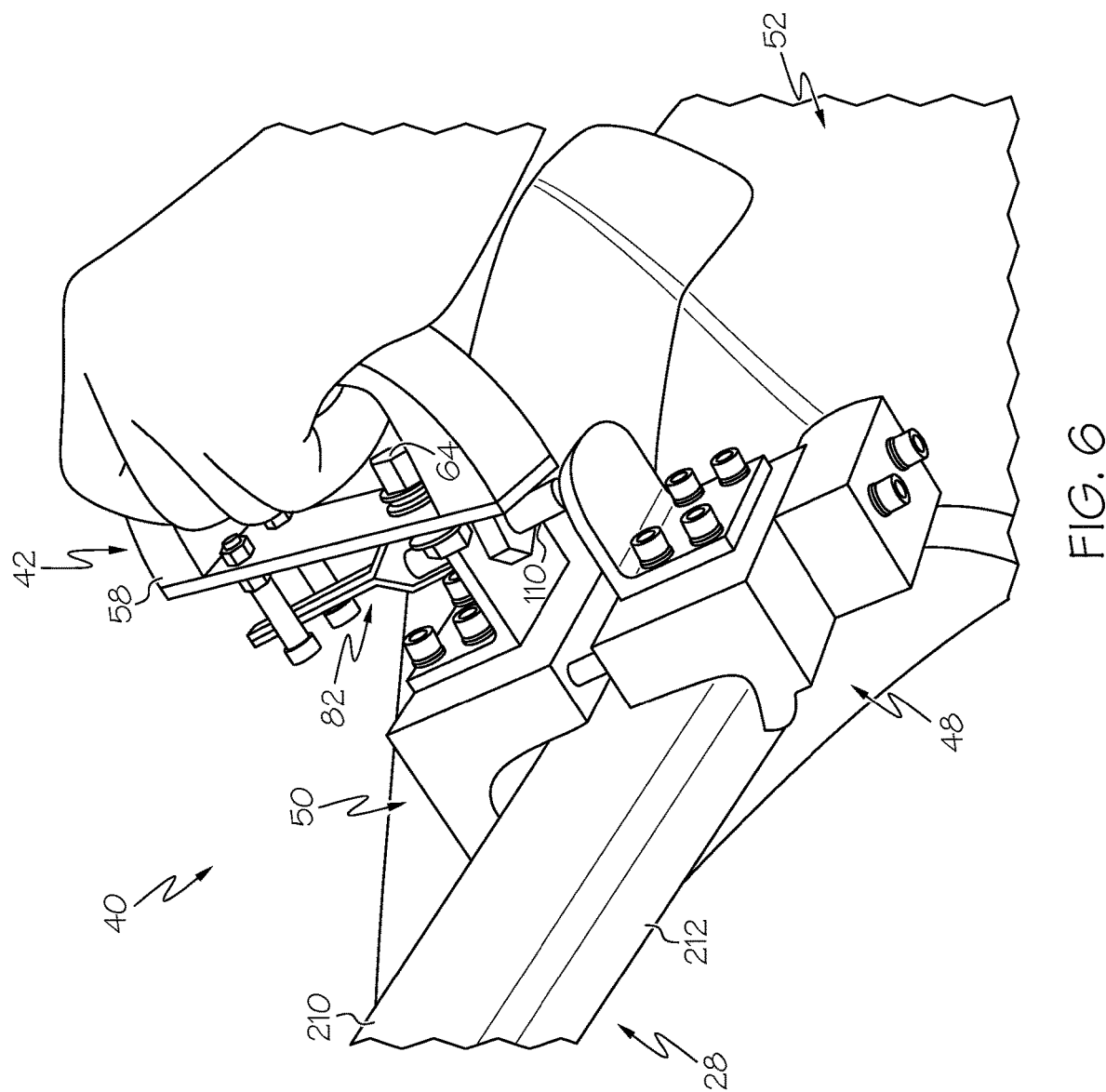
FIG. 6 illustrates operation of the clamping assembly of FIG. 3 with the clamping assembly in the open configuration, according to one or more embodiments shown and described herein.
Figure 7:
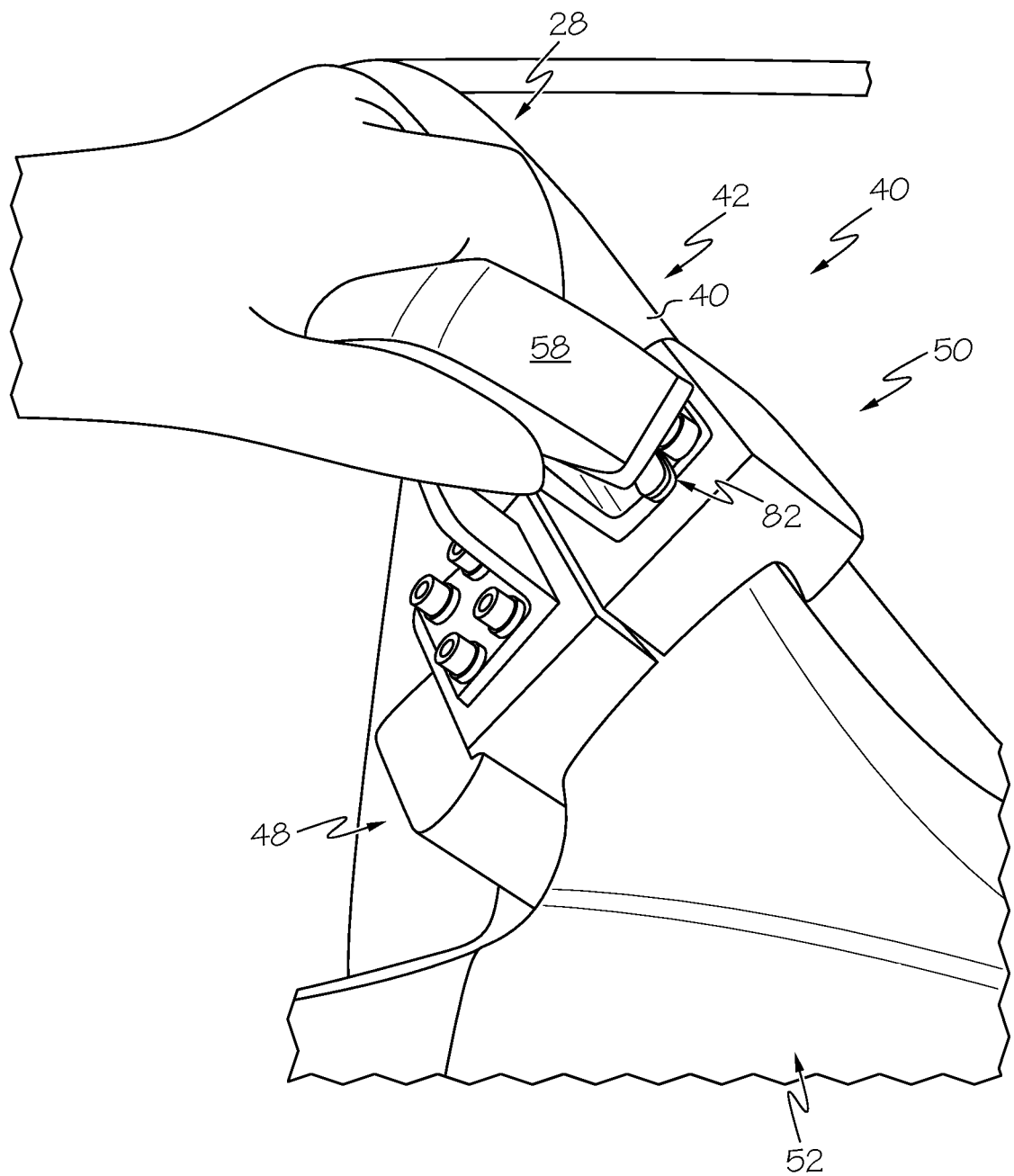
FIG. 7 illustrates operation of the clamping assembly of FIG. 3 with the clamping assembly in the closed configuration, according to one or more embodiments shown and described herein.

FIGS. 6 and 7 illustrate an assembly operation where the clamp assembly 40 is used to clamp the front fender 52 and the front pillar assembly 28. Referring to FIG. 6, the clamp assembly 40 is illustrated in the open configuration with the first jaw structure 48 spaced from the second jaw structure 50. Gravity may be used to place the clamp assembly in the open configuration due, at least in part, to the weight of the first jaw structure 48 and due to the operator supporting only the second jaw structure 50 directly using the handle assembly 42.

With the clamp assembly 40 in the open configuration, the shim structures 146 and 166 (FIG. 5) may be located within the seam 54 (FIG. 2), which locates the clamp assembly 40 in the vehicle longitudinal direction and spans the jaw assembly 44 across both the front pillar assembly 28 and the front fender 52. The second jaw structure 50 may be placed or hung against an upper side 210 of the front pillar assembly 28. With the jaw assembly 44 in the open configuration, the second jaw structure 50 may be spaced from a lower side 212 of the front pillar assembly 28, yet the clamp assembly 40 may be somewhat supported vertically by the upper side 210 of the front pillar assembly 28 and longitudinally by the shim structures 146 and 166 inserted within the seam 54 between the front pillar assembly 28 and the front fender 52.

The operator may then rotate the handle 58 of the handle assembly 42 about the pivot location 64 in the clockwise direction, as shown by FIG. 7. Rotating the handle 58 causes the arm actuation member 82 to rotate from the original, 12 o'clock position to an offset position of about 3 o'clock. As described above, rotation of the arm actuation member 82 retracts the actuation pin 110 (FIG. 6) and draws the first jaw structure 48 linearly toward the second jaw structure 50 to the closed configuration in a clamping plane that is parallel to the rotation direction of the handle 58. In the closed configuration, the operator may release the handle assembly 42 and the clamp assembly 40 may remain in the closed configuration until a manual force is applied to the handle assembly 42 by the operator.

The above-described clamp assemblies establish a temporary, releasable connection between a front fender and a front pillar assembly for reliably connecting the front fender to the vehicle frame during an assembly operation. The clamp assemblies can be operated using a single hand between open and closed configurations. Such one-handed operation is aided utilizing gravity which can be used by the operator to place the camp assemblies in their open configurations before closing the clamp assemblies when they are positioned against the vehicle. The clamp assemblies may further include shim structures that can fit within a seam between the front fender and the front pillar assembly. These shim structures can be used to reliably position the clamp assemblies on the vehicle so that the clamp assembly connects the front fender to the front pillar assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Directional terms used herein—for example widthwise, lengthwise, vertical, up, down, right, left, front, back, top, bottom, upper, lower—are made only to supply directional context.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A clamping assembly sized to clamp adjacent body panels of a vehicle together for an assembly operation, the clamping assembly comprising:
    a handle assembly comprising a handle that rotates in a first plane about a pivot location;
    a jaw assembly comprising a first jaw structure that moves in a line toward and away from a second jaw structure in a second plane parallel to the first plane by rotation of the handle; and
    a linkage assembly that operably connects the handle assembly and the jaw assembly using an actuation pin such that rotating the handle assembly in the first plane moves first jaw structure toward and away from the second jaw structure in the second plane between open and closed configurations by extending and retracting the actuation pin relative to the second jaw structure.

2. The clamping assembly of claim 1, wherein the handle assembly comprises a base portion connected to the pivot location and a handle portion connected to the base portion defining an opening that is sized to fit a hand of an operator.

3. The clamping assembly of claim 1, wherein the linkage assembly comprises an arm actuation member that is pivotally connected to the actuation pin, the arm actuation member being operatively connected to the handle assembly.

4. The clamping assembly of claim 3, wherein the handle assembly comprises a pair of bushings that are spaced-apart defining a gap therebetween, the arm actuation member having an arm that is slidingly received within the gap.

5. The clamping assembly of claim 4, wherein the handle assembly rotates in the first plane rotating the arm actuation member thereby extending and retracting the actuation pin.

6. The clamping assembly of claim 1, wherein the handle assembly is connected directly to the second jaw structure and indirectly to the first jaw structure.

7. The clamping assembly of claim 6, wherein the jaw structure comprises guide assembly that connects the first jaw structure to the second jaw structure.

8. The clamping assembly of claim 1, wherein the first jaw structure has a face that is shaped to grasp the body panels of the vehicle, the first jaw structure comprising a shim structure that extends outwardly from the face.

9. The clamping assembly of claim 8, wherein the second jaw structure has a face that is shaped to grasp the body panels of the vehicle, the second jaw structure comprising a shim structure that extends outwardly from the face of the second jaw structure that is sized to be received within a seam between the body panels.

10. The clamping assembly of claim 9, wherein the shim structures of the first and second jaw structures are aligned to be received within a seam between the body panels of the vehicle.

11. A method of holding a first body panel and a second body panel of a vehicle using a clamping assembly, the method comprising:
    placing the clamping assembly in an open configuration, the clamping assembly comprising:
        a handle assembly comprising a handle that rotates in a first plane about a pivot location;
        a jaw assembly comprising a first jaw structure that moves relative to a second jaw structure in a second plane parallel to the first plane; and
        a linkage assembly that operably connects the handle assembly and the jaw assembly using an actuation pin such that rotating the handle assembly in the first plane moves the first jaw structure in a line toward and away from the second jaw structure in the second plane between open and closed configurations by extending and retracting the actuation pin relative to the second jaw structure;
    placing the second jaw structure on the first body panel and the second body panel; and rotating the handle assembly to move the jaw assembly from the open configuration to the closed configuration.

12. The method of claim 11, wherein the step of placing the clamping assembly in the open configuration is performed by gravity moving the first jaw structure relative to the second jaw structure.

13. The method of claim 11, wherein the step of rotating the handle assembly is performed manually using a single hand of an operator.

14. The method of claim 11, wherein the first jaw structure has a face that is shaped to grasp the first and second body panels of the vehicle, the first jaw structure comprising a shim structure that extends outwardly from the face.

15. The method of claim 14, wherein the second jaw structure has a face that is shaped to grasp the body panels of the vehicle, the second jaw structure comprising a shim structure that extends outwardly from the face of the second jaw structure.

16. The method of claim 15 further comprising locating the shim structures of the first and second jaw structures within a seam between the first body panel and the second body panel.

17. A clamping assembly sized to clamp adjacent body panels of a vehicle together for an assembly operation, the clamping assembly comprising:
   a handle assembly comprising a handle that rotates about a pivot location;
   a jaw assembly comprising a first jaw structure that moves relative to a second jaw structure; and
   a linkage assembly that operably connects the handle assembly and the jaw assembly using an actuation pin, the linkage assembly comprising an arm actuation member that is pivotally connected to the actuation pin, the arm actuation member being slidably connected to the handle assembly within a gap between spaced-apart bushings.

18. The clamping assembly of claim 17, wherein the linkage assembly connects the handle assembly and the jaw assembly using the actuation pin such that rotating the handle assembly in a first plane moves the first jaw structure toward and away from the second jaw structure in a second plane that is parallel to the first plane.

19. The clamping assembly of claim 17, wherein
   the first jaw structure has a face that is shaped to grasp the body panels of the vehicle, the first jaw structure comprising a shim structure that extends outwardly from the face; and
   the second jaw structure has a face that is shaped to grasp the body panels of the vehicle, the second jaw structure comprising a shim structure that extends outwardly from the face of the second jaw structure that is sized to be received within a seam between the body panels.

20. The clamping assembly of claim 19, wherein the shim structures of the first and second jaw structures are aligned to be received within a seam between the body panels of the vehicle.

\* \* \* \* \*